United States Patent [19]

Plagnard

[11] 4,443,403

[45] Apr. 17, 1984

[54] APPARATUS FOR LOADING AND UNLOADING FUEL ASSEMBLIES FOR A FAST NEUTRON NUCLEAR REACTOR

[75] Inventor: André Plagnard, Montrouge, France

[73] Assignee: Novatome, Le Plessis Robinson, France

[21] Appl. No.: 272,430

[22] Filed: Jun. 10, 1981

[30] Foreign Application Priority Data

Jul. 1, 1980 [FR] France .............................. 80-14637

[51] Int. Cl.$^3$ ............................................. G21C 19/20
[52] U.S. Cl. ....................................... 376/270; 376/268
[58] Field of Search .............. 376/264, 270, 268, 262

[56] References Cited

U.S. PATENT DOCUMENTS

| 3,847,734 | 10/1974 | Schwartz | 376/268 |
| 3,915,792 | 10/1975 | Aubert et al. | 376/270 |
| 3,997,393 | 12/1976 | Allain et al. | 376/268 |
| 4,202,729 | 5/1980 | Allain et al. | 376/270 |
| 4,364,899 | 12/1982 | Aubert et al. | 376/270 |

FOREIGN PATENT DOCUMENTS

5241792 9/1975 Japan .................................. 376/270

Primary Examiner—Sal Cangialosi
Attorney, Agent, or Firm—Pollock, Vande Sande & Priddy

[57] ABSTRACT

Apparatus for loading and unloading fuel assemblies, for fast neutron nuclear reactors, and in particular for groups of fast neutron nuclear reactors cooled by liquid sodium located on one and the same site. The apparatus is removable as a unit and comprises a lock chamber (25) in the form of a removable and transportable vessel. The vessel (25) contains a pivoting ramp (35) allowing transfer of assemblies between the primary ramp (28) and the secondary ramp (29) of the nuclear reactor. Apertures (26) and (27) corresponding to the ramps (28) and (29) respectively are provided in the wall of the vessel (25) and connecting and isolating apparatuses (30) and (31) allow the lock chamber to be placed in communication with the ramps of the reactor, or conversely to be separated from the reactor and isolated.

6 Claims, 10 Drawing Figures

APPARATUS FOR LOADING AND UNLOADING FUEL ASSEMBLIES FOR A FAST NEUTRON NUCLEAR REACTOR

FIELD OF THE INVENTION

The invention concerns an apparatus for loading and unloading fuel assemblies for a fast neutron nuclear reactor allowing assemblies to be moved between a primary loading and unloading ramp communicating with the vessel of a fast neutron reactor and a secondary ramp communicating with a region for storing or loading assemblies.

BACKGROUND OF THE INVENTION

In fast neutron nuclear reactors, the fuel assemblies constituting the core of the nuclear reactor disposed in the reactor vessel must be replaced after a certain length of service.

In this type of reactor, means are therefore disposed which allow extraction of irradiated assemblies from the reactor core and then from the reactor vessel so that they can be transferred to a storage and decontamination region or to a means of transport and temporary storage.

These extraction and transfer means generally comprise a transfer machine disposed above the reactor vessel allowing assemblies to be extracted from the core, transferred and placed in a region of the reactor vessel at which a ramp, termed the "primary ramp", opens for transporting assemblies. This primary ramp allows transport of assemblies from the reactor vessel to a transport apparatus termed the "loading and unloading lock chamber" in which the assembly can be transferred to another ramp termed the "secondary ramp" which communicates with a region for storing assemblies or with a region for loading these assemblies into means for transport or temporary storage.

The assemblies are moved inside the primary and secondary ramps by traction apparatuses such as hoists.

The loading and unloading lock chamber contains a movable ramp fixed to a revolving member allowing it to be rotated under the action of drive means disposed at the upper part of the lock chamber so that it moves by pivoting between a position in which the movable ramp forms an extension of the primary ramp and a position in which this movable ramp forms an extension of the secondary ramp.

The traction apparatus is generally fixed on the revolving member and therefore follows the rotary movements of the movable ramp.

Other apparatuses for moving the assemblies inside the primary and secondary ramps can also be fixed to these ramps to move the assemblies during part of their transportation between the vessel and the loading and unloading lock chamber or between the loading and unloading lock chamber and the storage region.

Some loading and unloading lock chambers have two movable ramps the simultaneous rotation allows each of these ramps to be moved from a position in communication with the primary ramp to a position in which it is in communication with the secondary ramp, and vice versa.

These assemblies can thus be moved from the primary ramp to the secondary ramp when the assemblies have been brought inside the movable ramp by traction apparatuses.

The loading and unloading lock chamber and the transfer apparatuses associated with it rest on the structure of the reactor on which the vessel and the attached equipment of the reactor are fixed.

The lock chamber takes up a great deal of space and the cost of constructing this element constitutes a relatively large part of the cost of constructing the reactor.

Also, the lock chamber is in operation only at great intervals corresponding to periods when the reactor is halted for reloading with fuel. In practice, the lock chamber serves not only to unload irradiated assemblies but also to reload the reactor with new assemblies, moving of these assemblies being carried out from the storage region to the reactor core by means of secondary and primary ramps.

The mechanical apparatuses of the loading and unloading lock chamber are therefore brought into use at widely spaced time intervals, so that those mechanical elements which have been at rest for a very long time cannot be relied on to work properly.

There is a current tendency in the construction of fast neutron nuclear reactors to group these reactors, for example in units of two or four, on one and the same site so as to reduce some of the capital cost by shared use of some elements of these reactors.

The use of a single loading and unloading lock-chamber for a group of several reactors has never been thought of before, however.

OBJECT OF THE INVENTION

The object of the invention is therefore an apparatus for loading and unloading fuel assemblies for a fast neutron nuclear reactor allowing assemblies to be moved between a primary loading and unloading ramp communicating with the vessel of a fast neutron reactor and a secondary ramp communicating with a region for storing or loading assemblies, constituted by a lock chamber resting on the structure of the reactor, the latter also bearing the primary and secondary ramps, inside which a transfer means is fixed, constituted by at least one ramp movable by pivoting between a position in communication with the primary ramp and a position in communication with the secondary ramp, by means of drive means, and at least one apparatus for moving the assemblies inside the ramps connected to the movable ramp, this loading and unloading apparatus being intended to allow the cost of constructing nuclear reactors grouped on one and the same site to be reduced while also assuring that the mechanical elements of the apparatus are more frequently in service on one or another of adjacent nuclear reactors and also allowing easy maintenance of the lock chamber while the reactor is operating.

For this purpose, the loading and unloading apparatus according to the invention is wholly removable, the lock chamber being constituted by a removable transportable vessel, including connecting and isolating means, at apertures in its wall, so that it can be put into communication with the primary and secondary ramps of a reactor.

Several embodiments of a transfer apparatus according to the invention, in the case of fast neutron nuclear reactors cooled by liquid sodium, will now be described by way of non-limiting examples, with reference to the attached drawings, so that the invention can be fully understood.

DESCRIPTION OF PREFERRED EMBODIMENT

Figure 1:
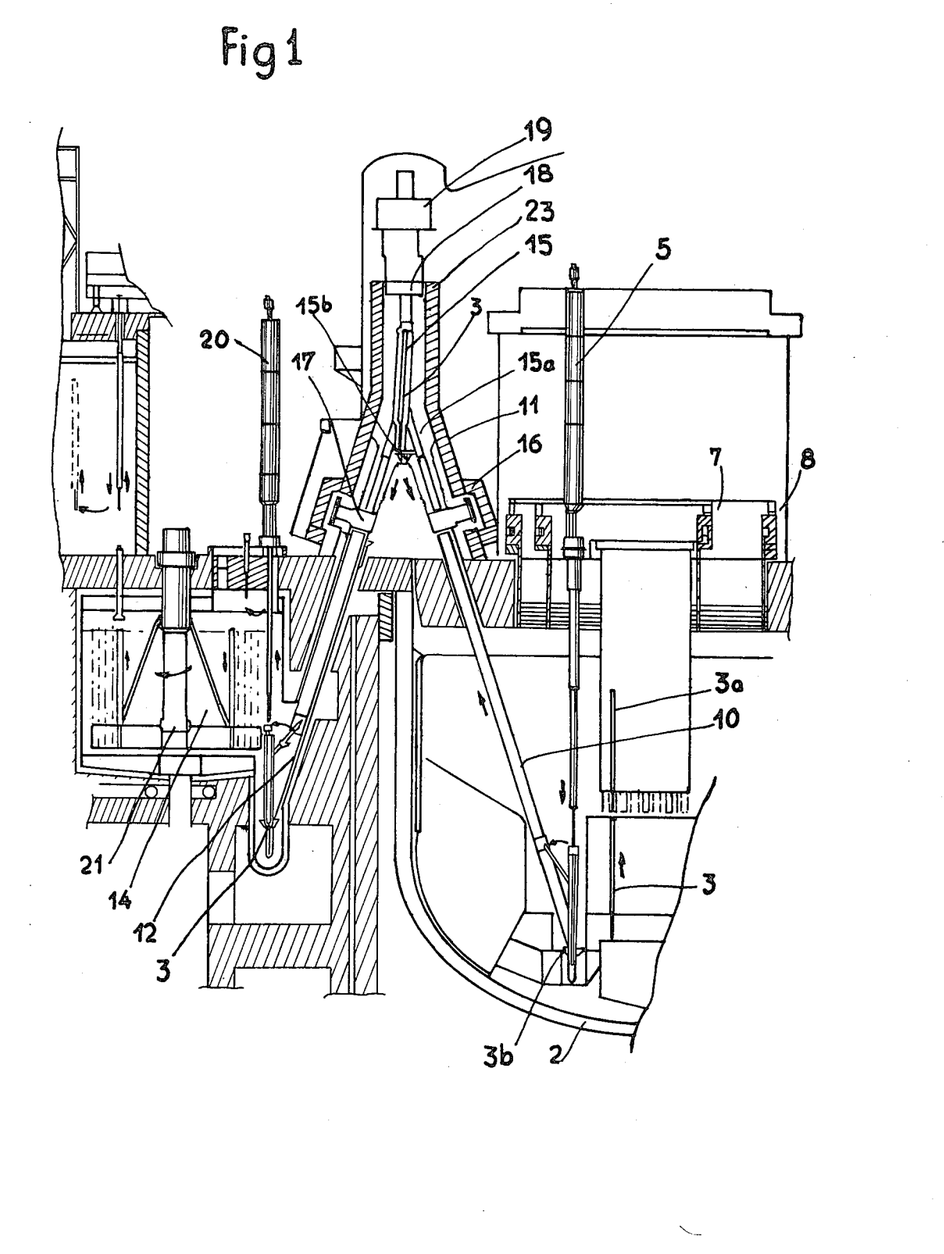
FIG. 1 represents diagrammatically the whole of a prior art apparatus for transferring an assembly between the reactor core and a region for storing and decontaminating assemblies, in the case of a nuclear reactor including a loading and unloading lock chamber.

FIG. 1 shows the structure 1 of a nuclear reactor bearing a vessel 2 inside which fuel assemblies 3 are disposed, constituting the core of the nuclear reactor.

A transfer machine 5, which can be moved in rotation by means of rotating plugs 7 and 8 so as to occupy any position above the lattice of fuel assemblies, assures transfer of the assemblies 3 first to position 3a by means of telescopic movements of the transfer machine, then to position 3b by rotation of the transfer machine and then lowering of the assembly vertically by telescopic movements.

In position 3b, the assembly can be tilted into a ramp termed the "primary ramp" which opens at its upper part into a lock chamber 11 inside which a ramp 12 also opens, so that the lock chamber communicates with a storage region 14.

Isolation of the lock chamber with respect to the ramps 10 and 12 can be obtained by means of valves 16 and 17.

A ramp 15 movable in rotation and solid with a rotating plate 18 disposed at the upper part of the lock chamber 11 can come successively into position 15a in communication with the primary ramp and position 15b in communication with the secondary ramp.

An assembly 3 can be brought inside this movable ramp from the primary ramp or from the secondary ramp by means of a hoist 19 mounted above the lock chamber 11 which is termed the "loading and unloading lock chamber".

Moving assemblies inside the ramps 10 and 12 and inside the lock chamber can be carried out the hoist 19 alone or by in combination with other hoists disposed at the entry to the primary and secondary ramps.

At the exit from the ramp 12, the assembly can, after tilting into vertical position, be taken up by a transfer machine 20 which can move the assembly 3 in the vertical direction in both directions, allowing assembly 3 to be placed in any position inside the rotating storage drum 21 disposed inside the storage region 14.

Conversely, new assemblies disposed in the storage region can be raised by the transfer machine 20 and disposed in the part of this region which allows them to tilt into the secondary ramp 12 so that these assemblies can be introduced into the reactor vessel by means of the loading or unloading lock chamber 11.

The loading and unloading lock chamber is permanently disposed on the structure 1 of the nuclear reactor which supports the ramps 10 and 12 opening into the lock chamber.

It is clear that, in this apparatus according to the prior art, the large lock chamber forms a complex and bulky unit covered by very thick casings 23 to protect the regions near the lock chamber from radiation.

Figure 2:
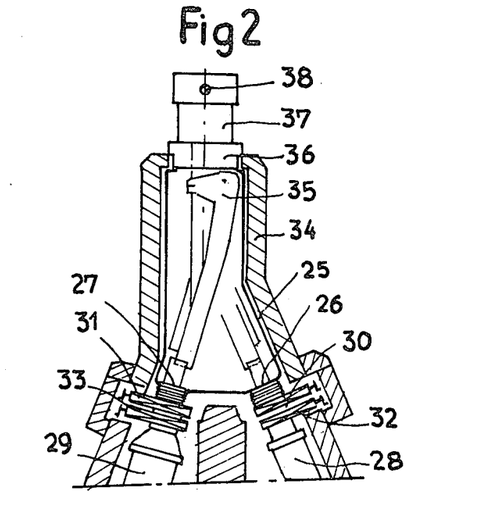
FIG. 2 represents in a sectional view at a vertical plane of symmetry a loading and unloading apparatus according to the invention in operating position on a nuclear reactor.
Figure 3:
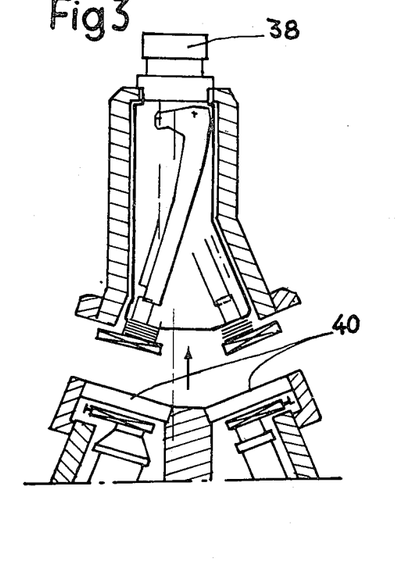
FIG. 3 represents in a sectional view identical to the view of FIG. 2 the same apparatus uncoupled from the nuclear reactor.

FIGS. 2 and 3 show a loading and unloading apparatus according to the invention in its positions for service on the reactor and uncoupled with respect to this reactor.

Such an apparatus according to the invention has a closed, sealed, metal vessel 25 with two apertures 26 and 27 corresponding respectively to the primary and secondary ramps 28 and 29 of the reactor on which the removable lock chamber according to the invention is positioned.

Valves 30 and 31 respectively enable these apertures 26 and 27 located on the vessel to be closed, while the valves 32 and 33 respectively allow the ends of the primary and secondary ramps to be closed, these ramps communicating with the interior of the reactor and the storage region.

Connection flanges disposed between the valves 30 and 32 and 31 and 33 respectively allow the removable lock chamber constituted by the sealed vessel 25 to be fixed on the primary and secondary ramps of a nuclear reactor.

The apparatus for connection and isolation between the lock chamber and the reactor ramps will be described in further detail with reference to FIGS. 7, 8, 9 and 10.

The vessel 25 is covered by elements 34 assuring shielding from radiation of the outside of the lock chamber with respect to the inside.

A movable ramp 35 is disposed inside the lock chamber on a rotating element 36 which allows this ramp to be placed in communication with either the primary ramp 28 or the secondary ramp 29.

Above the rotating unit 36 a hoist 37 is disposed which allows the fuel assemblies to be moved inside the ramps either upwards or downwards.

FIG. 3 shows that, when uncoupling between the removable lock chamber and the reactor has been carried out by removal of the assembly flange disposed between the isolating valves, the removable lock chamber can be raised by means of an overhead travelling crane, connector elements 38 being provided on the upper parts of the lock chamber.

Where several nuclear reactors are disposed on one and the same site, it is possible to transport the removable lock chamber to another nuclear reactor where coupling with the primary and secondary ramps can be effected. The apertures in the structure of the nuclear reactor from which the lock chamber has just been removed are closed by radiation shielding plates 40.

Figure 4:
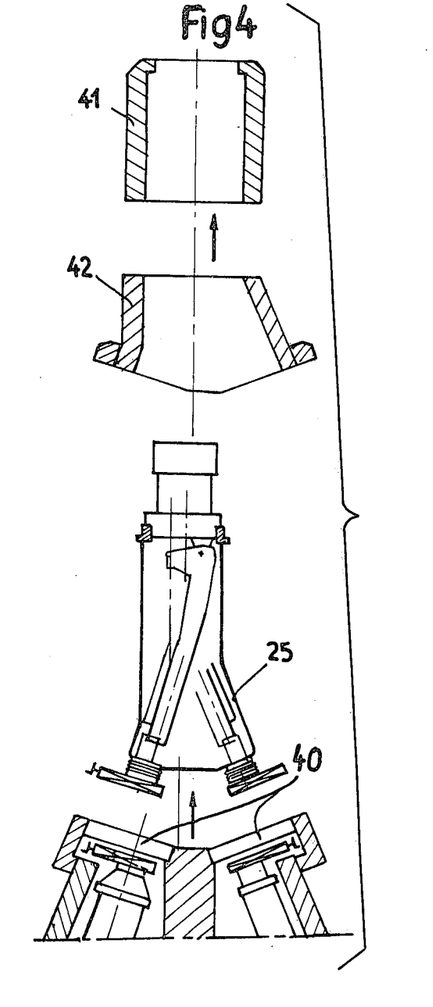
FIG. 4 represents, in a sectional view identical to the views of FIGS. 2 and 3, a second embodiment of a loading and unloading apparatus according to the invention, in its uncoupled position with respect to the nuclear reactor.

FIG. 4 shows a removable lock chamber identical to the lock chamber represented in FIGS. 2 and 3, but having radiation shielding elements constituted by two separate parts 41 and 42 which can be placed in position on the vessel 25 or conversely removed therefrom independently of each other.

In practice, the lock chamber and its radiation shielding elements form a very heavy unit, weighing 400 to 500 tons, for example, and it can prove difficult to have available lifting means sufficient to lift the lock chamber unit above the reactor and move it into a new service position above another reactor.

In the case of the apparatus represented in FIG. 4, before the lock chamber is raised above the reactor for transportation, the pieces 41 and 42 are lifted and transported to a place near the nuclear reactor on which the lock chamber is to be disposed, before lifting and transportation of the latter is carried out as represented in FIG. 4.

Figure 5:
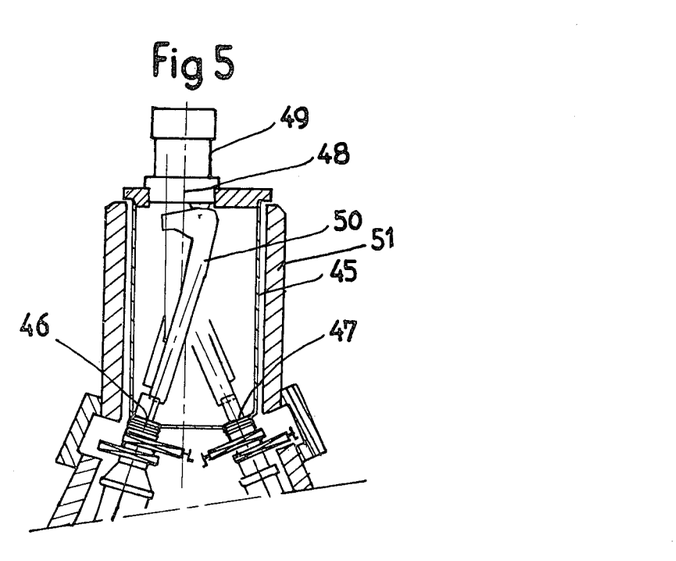
FIG. 5 represents a sectional view at a vertical plane of symmetry of a third embodiment of a loading and unloading apparatus according to the invention, the loading and unloading apparatus being in operating position on the nuclear reactor.
Figure 6:
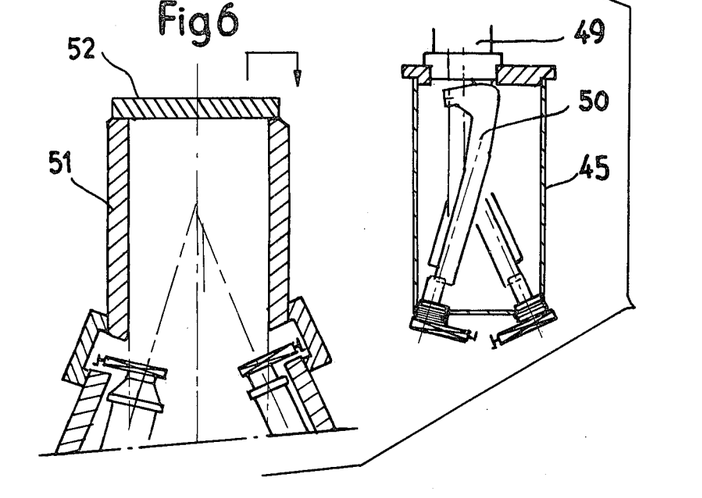
FIG. 6 represents, in a sectional view identical to the view of FIG. 5, the apparatus represented in this figure in its uncoupled position with respect to the nuclear reactor.

FIGS. 5 and 6 show another embodiment of the vessel of the removable lock chamber, this vessel 45 being constituted by a cylinder with two apertures 46 and 47 at its lower part and a unit 48 for moving the movable ramp 50 as well as a hoist 49 at its upper part.

As FIG. 6 shows, this unit can be disconnected from the primary and secondary ramps of the reactor and extracted from the protective structure 51 constituted by a very thick cylinder, made of shielding material disposed at a fixed station on the reactor and having a cross-section corresponding to that of the vessel.

A complementary protective plate 52 is then disposed on the upper part of the cylinder 51 to isolate the interior of the reactor totally.

Figure 7:
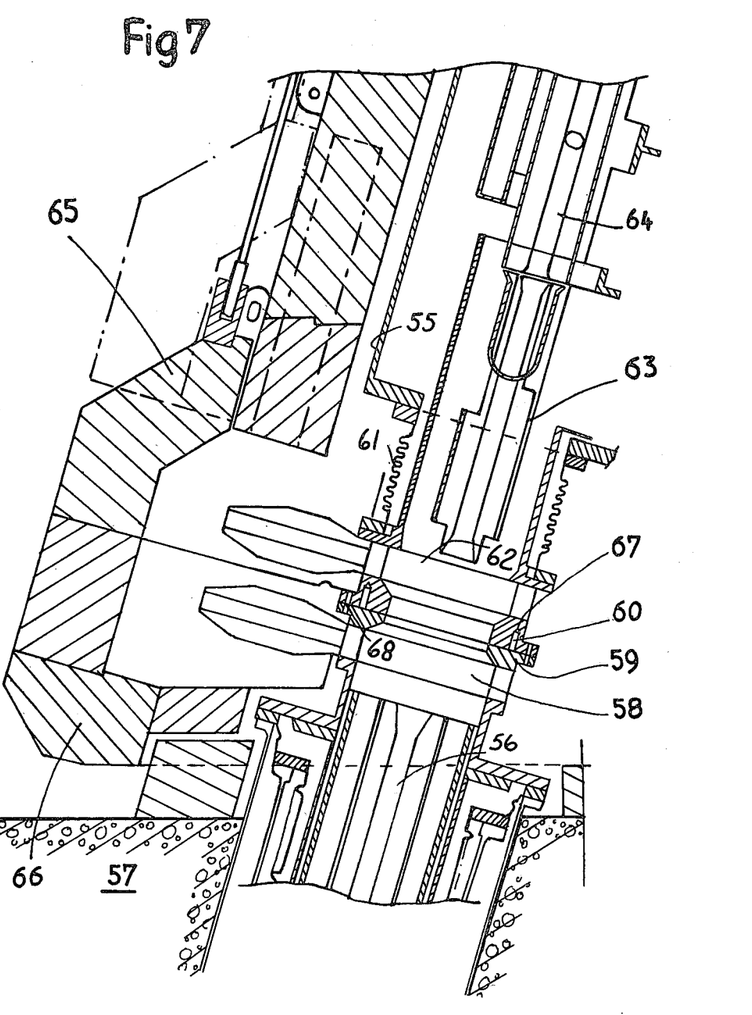
FIG. 7 represents, in a sectional view at a plane of symmetry, a first embodiment of connecting and isolating means for the lock chamber, in operating position on the reactor.
Figure 8:
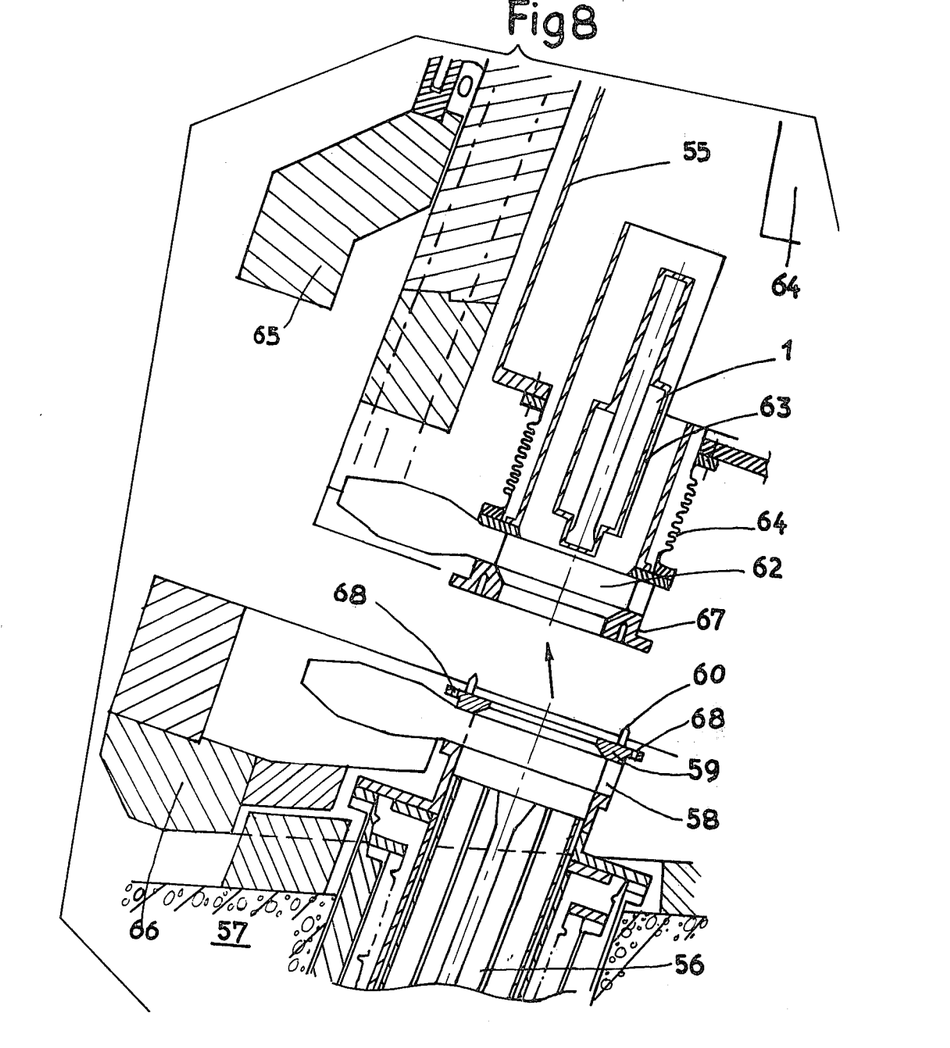
FIG. 8 represents the connecting and isolating means of the lock chamber represented in FIG. 7 in their uncoupled position with respect to the nuclear reactor.

FIGS. 7 and 8 show in greater detail the whole of the means for connecting and isolating the lock chamber and the secondary ramp of the reactor.

These connecting and isolating means are positioned at the apertures of the vessel 55 allowing the latter to be placed in communication with the primary ramp or with the secondary ramp.

FIGS. 7 and 8 show the connecting and isolating means which allow the vessel to be put in communication with the secondary ramp 56 solid with the structure 57 of the reactor. The ramp 56 is solid with a unit comprising an isolating valve 58 and a mounting flange 59 bearing guide pins 60.

The vessel 55 bears on its lower part, by a bellows joint 61 an isolating valve 62 and a ramp section 63 fixed with respect to the vessel 55, apart from slight displacements or deflections of this ramp 63 with respect to the vessel 55, obtained by deformation of the bellows joint 61 positioned in the extension of the ramp 56.

The movable ramp 64 can then come into position as an extension of the ramp 63 by tilting.

FIG. 7 shows the ramp 64 in its position for communication with the secondary ramp 56 and FIG. 8 shows the movable ramp 64 in a position in which the movable ramp and the fixed ramp are no longer extensions of each other. The movable ramp is displaceable by tilting and rotation between the position represented in FIG. 7 and a position in which the movable ramp 64 forms an extension of a fixed ramp section (not represented) allowing connection with the primary ramp of the reactor.

The vessel 55 is surrounded by elements 65 protecting against radiation, which elements, when the lock chamber is put in position on the reactor, form extensions of protective elements 66 solid with the structure 57 of the reactor, so as to constitute a jointly therewith protection over the whole periphery of the lock chamber.

A flange 67 is also solid with the valve 62 at its lower end and comes into position opposite the flange 59 solid with the valve 58 disposed on the fixed support structure of the secondary ramp of the reactor.

The flange 67 has bores allowing guide pins 60 to be placed in position when the lock chamber docks with the reactor.

As the removable lock chamber according to the invention is to serve for several reactors, disposed on one and the same site, for example, the connection apparatus of this lock chamber must be adaptable to slight differences in dimensions which may exist between two reactors, affecting the inclination or position of the primary and secondary ramps. For this reason ramp 63 solid with the vessel 55 is fixed to the latter by a bellows joint 61 which allows slightly displacements or deflections.

In this way, the guide pins 60 of the flange 59 can always be made to coincide with the bores in the flange 67. During positioning of the two connecting and isolating apparatuses corresponding to each of the primary and secondary ramps, securing of the lock chamber is effected by clamping together the flanges 59 and 67 and the corresponding flanges at the primary ramp. The flanges 59 and 67 have a certain number of bores 68 for this, in which screws are introduced which are secured by nuts.

When the movable ramp 64 comes into position by tilting with respect to the ramp 63 to form an extension of this, by means of a stop arresting its travel at the required place, continuity of the ramps is assured between the movable ramp and the primary and secondary ramps of the reactor.

A slight angular variation in the displacement of the movable ramp allows accommodation of slight deviations arising from differences between the inclinations or spacings of the ramps of one reactor in relation to another.

Figure 9:
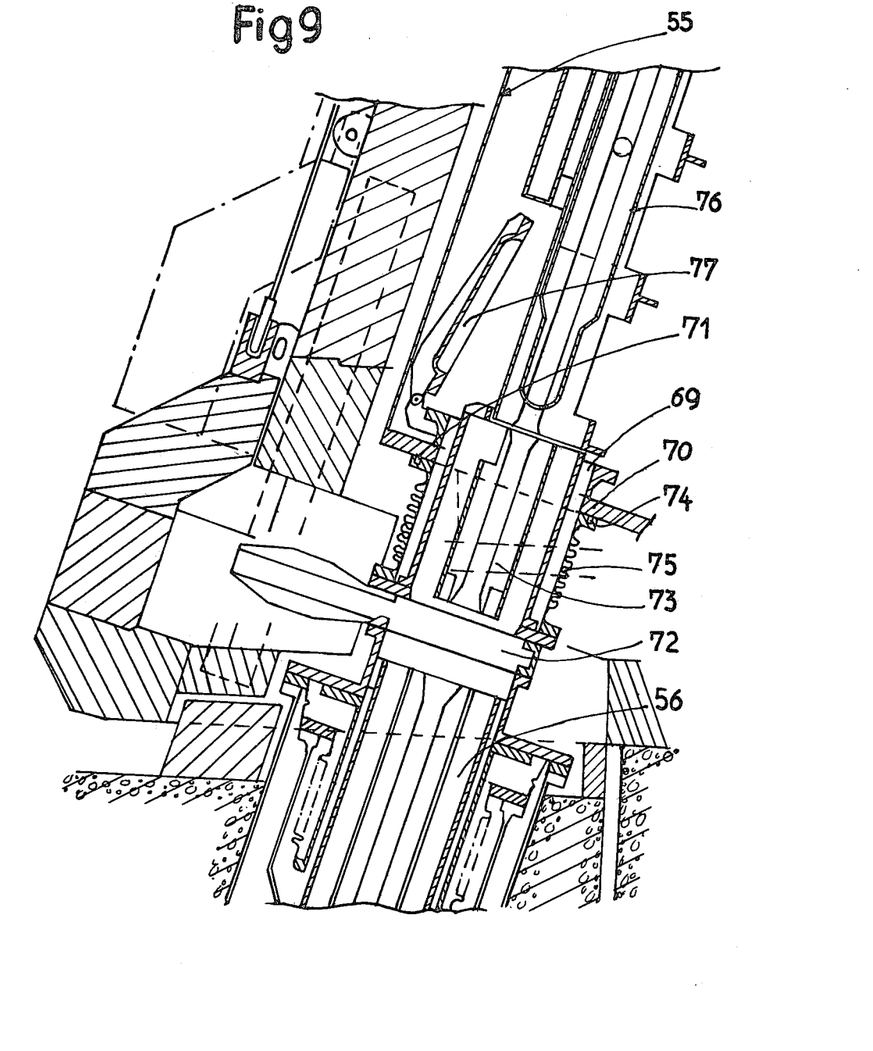
FIG. 9 represents in a sectional view a second embodiment of the connecting and isolating means of the lock chamber.
Figure 10:
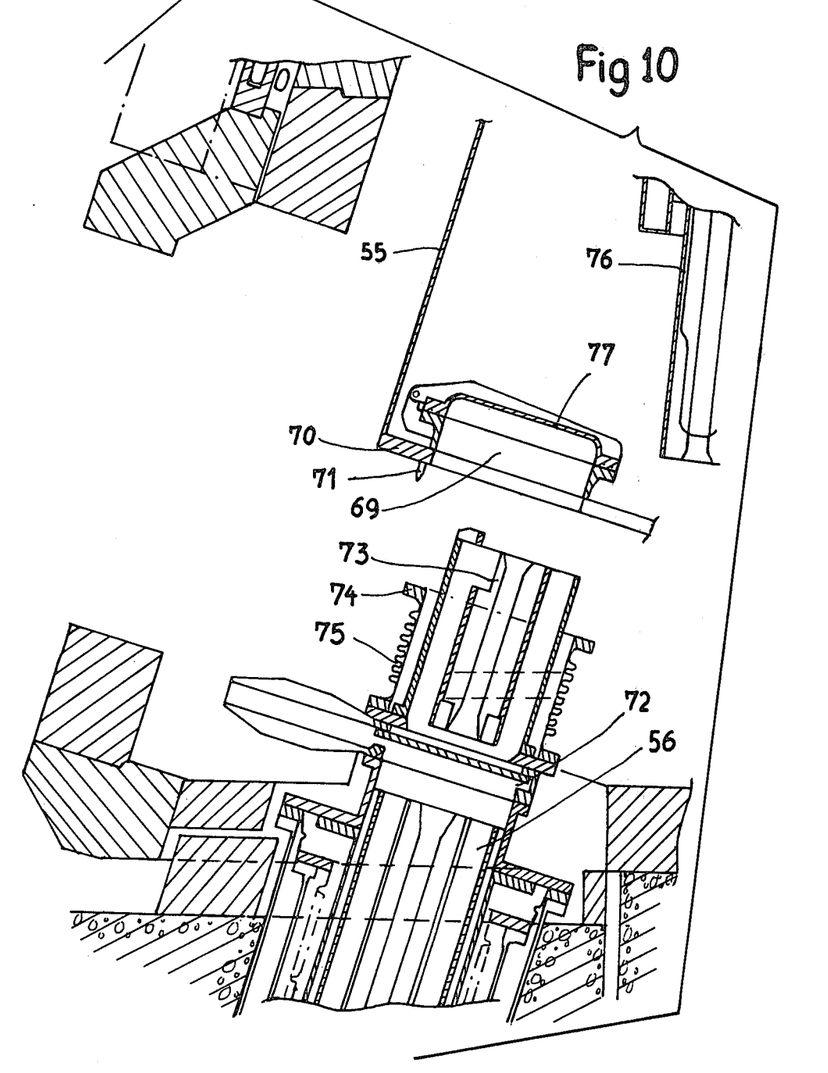
FIG. 10 represents the connecting and isolating means of the lock chamber represented in FIG. 9 in their uncoupled position with respect to the nuclear reactor.

FIGS. 9 and 10 show another embodiment of the apparatus for connection and isolation between the vessel 55 and the secondary ramp 56, the vessel 55 bearing at its aperture 69 a flange 70 bearing guide pins 71.

The upper end of the ramp 56 bears a valve 72 itself extended by a ramp portion 73 while a flange 74 with bores corresponding to the guide pins 71 is fixed on the valve 72 by a bellows joint 75.

In this way, differences in angle or spacing between the ramps and the apertures of the lock chamber can be accommodated when the lock chamber is moved from one reactor to another.

In this case, the tilter 76 comes into position as an extension of the ramp portion 73 by tilting.

An inner valve 77 allows the aperture 69 to be closed when the lock chamber is isolated with respect to the external environment, for example for transport purposes.

The principal advantages of the apparatus according to the invention are that (a) it allows use of only one lock chamber containing the movable apparatuses for loading and unloading the assemblies per group of reactors, thereby allowing saving on the costs of constructing the nuclear reactor, (b) it allows the mechanisms associated with the lock chamber to be operated more frequently; and (c) it allows easy maintenance of the lock chamber while the reactor is operating.

Also, between periods of use of the lock chamber on the nuclear reactor, a large space is left available above the vessel of the reactor in the building for the latter.

The invention is not, however, limited to the embodiments described; it also includes all the variants thereof.

Thus, the shape of the vessel constituting the lock chamber is not limited to the shapes described and represented, the way in which the lock chamber is secured and isolated can be different from the securing and isolating methods described, and protection against radiation can be obtained differently from the particular methods described.

Finally, the loading and unloading apparatus according to the invention can be used for all fast neutron nuclear reactors using a lock chamber moving the fuel elements from a primary ramp communicating with the reactor vessel to a secondary ramp communication with a position for storing or loading fuel assemblies.

I claim:

1. Apparatus for loading and unloading fuel assemblies, for a fast neutron nuclear reactor, allowing assemblies to be moved between a primary loading and unloading ramp (28) communicating with the vessel of said reactor and a secondary ramp (29) communicating with a region for storing or loading assemblies, comprising a lock-chamber (25) resting on the structure of said reactor, the latter also bearing the primary and secondary ramps (28, 29), said reactor having a transfer means (35) fixed therein, said transfer device comprising at least one ramp pivotable by drive means (36) between a position in communication with said primary ramp (28) and a position in communication with said secondary ramp (29), and at least one apparatus for moving said assemblies inside said ramps (28, 29) connected to said movable ramp (35), said primary and secondary ramps bearing isolating means (32, 33) at their ends, said apparatus being removable as a whole, said lock-chamber (25) being constituted by a removable vessel transportable from one said nuclear reactor to another and including connecting and isolating means (30, 31) at apertures (26, 27) in its wall for placing in communication with said primary and secondary ramps (28, 29) of a reactor at the ends of these ramps provided with isolating means (32, 33).

2. Loading and unloading apparatus according to claim 1, wherein said removable and transportable vessel (25) is constituted by a closed metal casing, and covered by elements (34) protecting against radiation.

3. Loading and unloading apparatus according to claim 2, wherein said elements (41, 42) protecting against radiation are removable with respect to said metal vessel (25), transportation of said vessel (25) being carried out without said protective elements (41, 42).

4. Loading and unloading apparatus according to claim 2, wherein said protective elements (51) are permanently fixed to said reactor and said vessel (45) can be introduced inside said protective elements (51).

5. Loading and unloading apparatus according to any one of claims 1 to 4, wherein said connecting and isolating means are constituted by a valve (62) and a flange (67) connected to said vessel (55) by a deformable joint (61), a ramp portion (63) intended to cooperate with said movable ramp (64) through an abutment also being solid with said vessel (55) through said deformable joint (61) so as to allow alignment of said primary and secondary ramps and said movable ramp (64), even in case of differences in orientation and separation of said ramps, between one nuclear reactor and another between which the loading and unloading apparatus is transported.

6. Loading and unloading apparatus according to any one of claims 1 to 4, wherein said connecting and isolating means of the transfer apparatus are constituted by a flange (70) solid with said vessel (55) and by a valve (77) disposed inside the latter, the ramps solid with the structure of said reactor bearing a flange (74) corresponding to the flange (70) of the vessel borne by a deformable joint (75).

* * * * *